United States Patent Office 3,448,563
Patented June 10, 1969

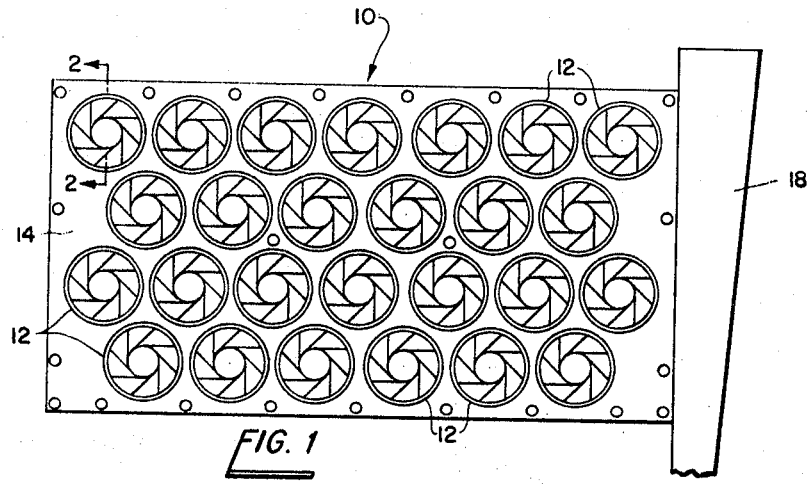
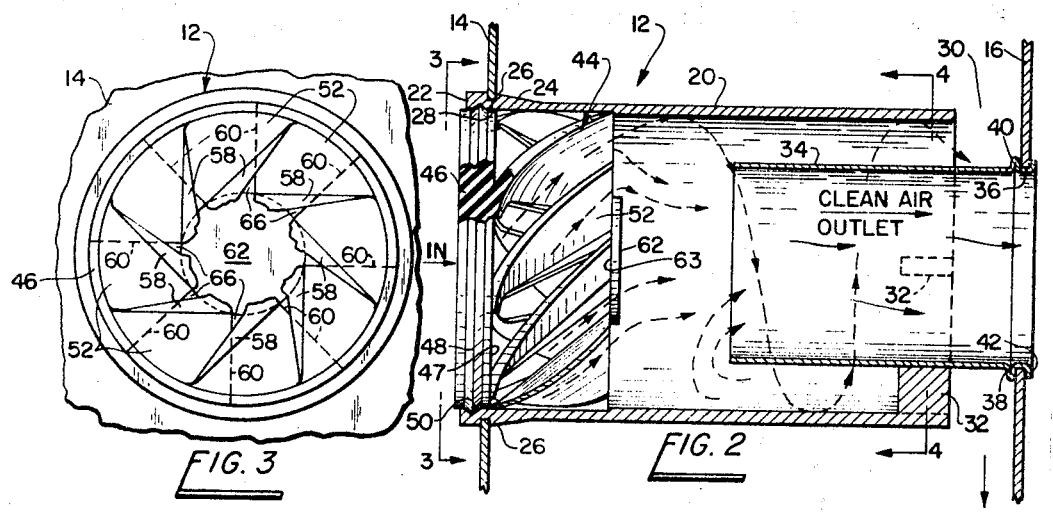
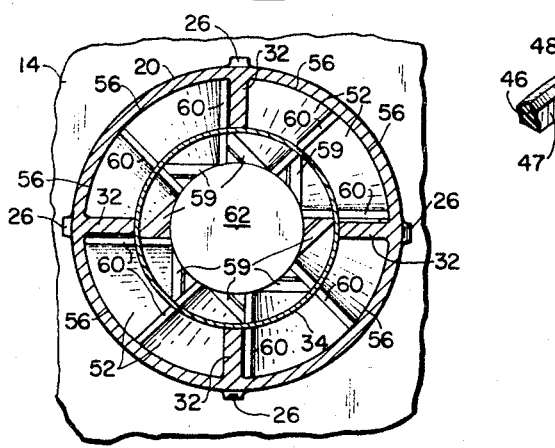

3,448,563
CYCLONE SEPARATOR HAVING SUBSTANTIALLY CENTRALLY LOCATED OPENINGS FOR LOWERING THE PRESSURE DROP ACROSS THE CYCLONE
Harold R. Sobeck, Novelty, Ohio, assignor to North American Rockwell Corporation, a corporation of Delaware
Filed Sept. 19, 1966, Ser. No. 580,522
Int. Cl. B01d 45/12
U.S. Cl. 55—347                                    11 Claims

ABSTRACT OF THE DISCLOSURE

A centrifugal type device for cleaning gas of entrained dust and like particles comprises an inlet tube extending at one end telescopically over a clean air outlet tube to form an annular discharge passage therebetween for air containing concentrated dust, the intake of the inlet tube mounting an integral deflector unit consisting essentially of generally triangular inclined deflector blades secured forwardly at the apex to a shroud and rearwardly at the radially inner corner of the base to an inperforate baffle aligned with the outlet tube, so that the intake is relatively unobstructed to bring a large area of incoming gas to be cleaned into immediate swirl imparting contact with the reflector blades with minimum pressure drop. The deflector blades combining with the baffle to block axial flow of gas through the device except for a plurality of relative small openings of predetermined finite size. The openings are spaced around the periphery of said baffle. Each opening is defined by the intersection of two adjacent blades and the periphery of said baffle when the device is viewed from the inlet end. These openings result in a reduced pressure drop across the device.

---

The present invention refers to gaseous fluid cleaning apparatus and more in particular to centrifugal or cyclone type dust collectors in which the incoming gas is moved in a whirling motion by which the dust or dirt particles carried by the gas are separated therefrom by centrifugal action to be deposited in a dust collector thus effectively removing the greater part of dirt particles from the gas stream.

The present invention provides a novel arrangement and construction of the intake deflector blade assembly incorporated in such type gas cleaners to obtain a high efficiency at rated capacity and minimum pressure drop.

In centrifugal type gas cleaners of the type herein referred to usually an inlet tube is provided into which coaxially and telescopically the outlet tube extends of considerably smaller diameter than the inner diameter of the inlet tube. The radial space between the inner outlet aube and outer inlet tube provides a channel along which the dirt particles—centrifugally thrown against the inner wall of the inlet tube—will be ferried by a percentage of the incoming gas toward the dust collecting duct. The open end of the inlet tube is usually closed by an arrangement of deflector blades providing predesigned tangential openings through which the gas must pass. The particular configuration of the deflector blades imparts a whirling movement to the gas stream to centrifugally separate dirt particles therefrom.

This type of centrifugal gas cleaner embodies a number of problems in that the configuration of the deflector blades, their space openings and their axial length in relation to the inlet tube must be designed such as to insure high efficiency at a minimum pressure loss. This was heretofore difficult to accomplish.

In many prior art devices of this kind considerable pressure loss and low efficiency has been experienced. Attempts to counter this deficiency have been tried by designing the air inlet tube frusto-conical, that is, of constantly decreasing diameter towards the outlet by which the gas flow will be accelerated as the vortex of the inlet tube changes its direction of flow to the inlet end. However, the return flow of gas, which is still spiralling around but in opposite direction to the spiral movement of the incoming gas create undesirable turbulency in the gas flow for which reason additional straightening vanes have to be incorporated between the cyclone inlet and the air outlet tube to change the turbulent gas flow to a straight axial flow.

Typical examples of such prior art are illustrated in United States Patent No. 2,647,588 issued Aug. 4, 1953 to C. E. Miller for "Boiler Tube Fly Ash Collector"; No. 2,806,551, issued Sept. 17, 1957 to O. X. Heinrich for "Centrifugal Dust Collector with Laminar Gas Flow"; and No. 3,030,755 issued Apr. 24, 1962 to R. S. Farr et al. for "Self-Cleaning Filter."

The present invention provides an improved simplified cyclone type gas cleaner unit which eliminates the above disadvantages by which the employment of additional gas flow straightening vanes can be omitted by retaining a desired pressure drop and maximum efficiency at rated gas flow volume. This is accomplished by the provision of a novel stationary deflector blade assembly at the intake end of the cyclone filter unit.

Accordingly, the main object of the present invention resides in the provision of an improved cyclone type gas filter unit comprising a novel deflector blade assembly constructed such that, at the rated gas flow, maximum efficiency is obtained at a constantly maintained acceptable rate of pressure loss.

Another object is to provide, in a cyclone type gas cleaner unit, a novel intake deflector blade assembly comprising a number of blades connected forwardly to a shroud ring and rearwardly to a center plate or baffle which is in line with and coaxial with the gas outlet tube and of such size as to block all but a predetermined small proportion of the straight flow of gas from the intake to the outlet tube.

These and other objects, novel features and improvements will become apparent or specifically be pointed out in the appended claims and in the following detailed description having reference to the accompanying drawings which illustrate a preferred form of embodiment and in which:

FIGURE 1 illustrates to a reduced scale an assemblage of a bank of identical cyclone gas cleaner units ready for installation;

FIGURE 2 is an axial cross-section through one of the cyclone gas cleaner units of the assemblage in FIGURE 1 drawn substantially to actual size for a preferred form;

FIGURE 3 is a front or left hand view of FIGURE 2;

FIGURE 4 is a cross-section through the unit in FIGURE 2 along line 4—4 and as viewed in the direction of the arrows; and FIGURE 5 is a perspective illustration of one of the blades of the novel deflector assembly illustrated in FIGURE 2.

With reference to FIGURE 1, the gas cleaner assemblage illustrated therein may comprise a panel 10 containing a bank of individual identical cyclone type gas cleaner units 12. The panel 10 is viewed from the front, that is, the air intake side and is composed of a front wall or partition 14 and spaced rear wall or partition 16 (FIGURE 2) which is the air or gas outlet side. Attached to either side of the panel or the bottom thereof may be a dirt collection conduit 18 which guides the dirt separated from the gas by the cyclone separator units and collected between partitions 14 and 16 into the dirt collector. The panels 10 may be of any desired size and shape and more than one panel may be assembled together for larger units for industrial applications and the like.

With further reference to the remaining figures the present novel cyclone type gas cleaner unit 12—which is shown in cross-section in FIGURE 2—comprises an outer tubular member 20 between the front wall 14 and rear wall 16 of the panel 10 which constitutes the gas inlet. The front end of the inlet tube 20 is provided with a flange portion 22 against the rear of which the front wall 14 abuts to limit further inward movement of the inlet tube 20. To prevent extraction of the inlet tube 20 after assembly a resilient portion 24 is provided adjacent the flange 22 having a number of equally spaced ribs 26 which abut the inner side of the front wall 14 to lock the tube 20 securely in place. Thus, to assemble the inlet tube to the panel 10 it needs only be pushed through an aperture 28 provided in the front wall. By this, the resilient portion 24 will be slightly compressed to allow the ribs 26 to pass through the aperture 28 to snap back behind the front wall to lock the tube in place. The inlet tube 20 does not extend all the way to the rear wall 16 of the panel but ends short thereof to provide a space 30 between the open inner end of the inlet tube and the rear wall 16 for a purpose to appear.

The inner end of the inlet tube 20 is provided inwardly with radially equally spaced axial flanges or ribs 32 which provide a support for a clean gas outlet tube 34 of considerably smaller diameter than the inlet tube 20 into which it extends telescopically. The outlet tube 34 is held axially aligned in concentric relationship to the outer tube 20 by means of the spacing ribs 32. Rearwardly the outlet tube 34 extends telescopically. The outlet tube 34 is held axially aligned in concentric relationship to the outer tube 20 by means of the spacing ribs 32. Rearwardly the outlet tube 34 extends out of the inlet tube 20 and bridges the space 30 to extend through an aperture 36 in the rear wall 16 of the panel 10. The oulet tube at its rear end is crimped at 38 to provide an inner flange 40 abutting against the rear wall 16 to prevent further movement of the outlet tube through the aperture. The end 42 of the outlet tube is peened over upon assembly against the outside of the rear wall 16 to lock the outlet tube in place.

Inserted within the front end of the inlet tube 20 is a novel deflector blade unit 44 preferably of non-metallic material. The deflector blade assembly 44 comprises an outer annular shroud ring 46 having a central rib 48 which extends radially around the shroud to fit into a complementary radial recess 50 within the inlet tube at the flange portion 22 thereof to retain the shroud and thus the deflector blade assembly in place.

Integrally attached to the inner downstream end 47 of the shroud ring 46 are a number of blades 52 (in this instance eight) of generally triangular configuration, as seen in detail in FIGURE 5. The blades 52 are attached to the shroud at the apex 54 formed by the longer sides of the triangle. The edge of the upper long side 56 of the triangular blade forms a gentle curve circumferentially rearwardly from the apex 54 whereas the lower side 58 of the triangular blade is substantially straight. Both long sides 56 and 58 extend in a rearward direction to be connected at their rear end opposite the apex 54 by the smaller straight side 60 of the triangular shaped blades 52.

At the lower side 58 the blades 52 are provided with a ledge like formation 59 which expands in area towards the rear where it is integrally attached to an end plate 62 thereby providing a reinforced area where the blades 52 are connected to the end plate 62 which assures a strong and durable blade assembly. The ledge formation 59 serves further to provide a blockage effect for the incoming gas by predeterminedly decreasing the space between adjoining blades.

The edges of sides 56 of the blades 52 lie in a common cylindrical envelope and engage the interior wall of the tube 20 along their entire length. The edges of sides 58 and ledges 59 lie in a common frusto-conical or frusto-conoidal surface coaxial with tube 20 and sides 60 lie in a common planar surface normal to the axis of tube 20. Sides 58 and ledges 59 thus define an unobstructed frusto-conoidal inlet chamber and the sides 56, 58 and 60 an annular swirl chamber about that inlet chamber.

The radially inner blade edges at 58 and the ledges 59 define essentially frusto-conoidal wall for the inlet chamber with the spaces between the inner edges of the blades being equiangularly spaced axially elongated circumferentially inclined outlet openings for that chamber. The base wall of that chamber lies at the shroud. The base ends 60 of the blades define the downstream planar end wall of the swirl chamber. Baffle 62 defines essentially an imperforate inner end of the inlet chamber.

The swirling gas leaving the swirl chamber through the apertures between the blade bases enters the downstream separation chamber that lies between the baffle 62 and the adjacent end of outlet tube 34. The right hand ends of tubes 20 and 34 in FIGURE 2 are outlets downstream of the separating chamber.

The blades 52 extend from the shroud ring 46 rearwardly in a helical fashion and are positioned such that the edges of the upper sides 56 of all the blades contact the inner surface of the inlet tube 20 thus preventing incoming gas from going over the blade edges but instead is forced to flow between the helically arranged blades. The blades are retained in this position by being attached rearwardly to a circular plate 62 at the apex 64 formed by the lower long side 58 and the short side 60 in relatively close spaced relationship. The circular end plate 62 which is of considerably smaller diameter than the shroud ring 46 has its upstream end face 63 longitudinally spaced from the shroud ring downstream end 47 and is concentrically positioned in relation to the outlet tube 34 and spaced a distance in front thereof. The size of the end plate 62 is sufficient to block a straight through flow of the incoming gas into the outlet tube so that the larger portion of the gas will be deflected along the blades and around the end plate 62. However, to obtain an acceptable pressure drop in relation to the desired efficiency the blades 52 are spaced around the outer edge of the end plate 62 in such position that between each two adjoining blades triangular openings 66 are formed clearly visible when viewed in an axial direction from the inlet side or outlet side of the cyclone unit as seen in FIGURES 3 and 4. Th size of these triangular openings 66 determines the amount of pressure drop and percentage of efficiency so that by simply increasing or decreasing the size of these openings a variety of different pressure drop and efficiency ratios can be obtained. Thus, increasing these openings by moving the blades farther out from the edge of the end plate 62 or reducing the size of the end plate the pressure drop will be lowered, however, the efficiency will be lowered too. Conversely, decreasing these openings 66 by carrying the blades further towards the center of the end plate or enlarging the size of the end plate the amount of pressure drop will be increased but the percentage of efficiency will be increased also.

Incoming gas from the inlet side of the panel 10 moves through the shroud ring 46 to hit the deflector blades 52. The larger part of the incoming gas is prevented from going straight through at the center of the deflector blade assembly by the end plate 62 and is thus forced along the helically arranged blades against the inner surface of the inlet tube and behind the deflector blade assembly 44 to move therealong in a helical path towards the rear of the inlet tube 20.

Because of the tapered configuration of the vanes or blades 52 only an initially small reduction in area is provided at the inlet keeping the pressure loss at a minimum. After the gas has entered the inlet tube its velocity is being increased by a gradual decrease in area as the gas moves through the blade assembly. This again provides for a minimum pressure loss and causes the least amount of turbulence. Due to the centrifugal action of the gas stream imparted thereto by the deflector blade assembly 44 dirt and dust particles entrained by the gas will be thrown outwards against the inner surface of the inlet tube and carried there along in a helical path. The predetermined radial spacing between the telescoped clean air outlet tube 34 and inlet tube 20 maintains a low pressure loss without the possibility of dust bridging over this space. Only a small portion of the incoming gas (preferably around 10%) which amount is controlled by the effectiveness of the suction blower (not shown) travels past the clean gas outlet tube opening farther along the inlet tube inside surface to the end thereof, carrying the dust and dirt particles separated from the gas stream with it. At the end of the inlet tube 20 the helically moving dirt laden gas stream is converted into a straight gas flow by means of the straight supporting ribs 32 within the inner end of the inlet tube 20 and joins the dirt laden gas flow coming from the other cyclone units in the panel 10. However, one advantage of the present novel device is that the gas flow need not be straightened at the outlet but functions equally well with a turbulent draw off, as for instance when the supporting ribs 32 would not be provided. The dirt particles may then be deposited in a dust bin due to gravity and the bleed air be exhausted to atmosphere or an aspirator may be provided to exhaust the dirt laden air into the atmosphere, these arrangements per se form no part in the present invention.

The greater portion of the gas intake leaving the deflector blade assembly 44 will move out through the clean gas outlet tube 34 after the larger part of the dust and dirt particles have been removed therefrom by centrifugal action. However, a small amount of uncleaned gas passes unrestricted through the triangular openings 66 between the end plate 62 and the blades 52 to obtain a desired amount of pressure drop. This small percentage of uncleaned gas mixes with the cleaned gas to go out through the outlet tube again raising the dirt content of the cleaned gas to a small degree. However, this is not objectionable in view of the overall efficiency in relation to the required pressure drop.

In one specific embodiment of the present invention, an air flow of 70 c.f.m. per tube at 75% to 80% efficiency with entrained coarse dust and a maximum pressure drop of 4 inches of water was required. To accomplish this result, the clean air outlet tube 34 was sized to maintain a low pressure loss without the possibility of dust bridging over the space between the clean air outlet tube 34 and the inside diameter of the tube 20. The center disc 62 of part 44 was made just large enough to cause a blinding of the clean air outlet tube 34 at the rated air flow. The spiral length of blades 52 was determined experimentally. The final form is as shown in the drawings which are to scale. There are eight triangular openings 66 (FIGURE 3) formed by the blades 52 where they connect to the center disc 62. This is an important novel aspect of this invention. Increasing the size of these openings 66 lowers the pressure drop and the efficiency and carrying these blades 52 onto the center of disc 62 raises the pressure drop and the efficiency.

In this specific embodiment, there were several factors that dictated the outlet tube diameter for this inertial tube type filter. In order to keep the entrance pressure loss into the outlet tube 34 to a reasonable value, it was necessary to maintain 1½ diameter minimum. A larger diameter would have been desirable from a pressure drop standpoint but one can not go much larger than 1½ inch diameter since this starts to approach the 2¼ inch diameter at which surface one is attempting to centrifuge the contaminant. Any diameter outlet tube greater than ⅞ inch sacrifices efficiency since the downstream diameter of our spinner 62 is ⅞ inch.

On the high efficiency tube version, an outlet tube diameter of 1 inch is maintained. With a 1 inch diameter for outlet tube 34, the vanes were initially constructed such that there were no triangular openings 66 between the vanes 52. This combination gave a high efficiency-high pressure drop version.

To merely open up the outlet tube to 1½ inch diameter with no triangular openings 66 in the vane section reduces the pressure drop and efficency but does not reduce the pressure drop enough while maintaining the efficiency higher than required for a low efficiency low pressure drop version. The triangular openings 66 were incorporated and made large enough so that enough dirty air by-passed the spinning vanes 52 and entered directly into the outlet tube 34. This sacrificed efficiency to lower the pressure drop through the spinning portion. If this is translated into area relationships, then the area of outlet tube 34 varies from 18%–42% of the inlet area defined by ring 46 and the area of the triangular openings 66 varies from a finite amount greater than zero but not greater than 2.5% of the inlet area defined by ring 46.

Thus the present invention provides an effective cyclone type gas cleaner which is simple in construction and thus easy to assemble, embodying a novel deflector blade assembly which by simply changing the position of the baldes at the end plate can provide for a variety of pressure drop-efficiency ratios.

What is claimed and desired to be secured by Letters Patent is:

1. Apparatus for separating entrained dust and like particles from a gaseous fluid stream comprising an inlet tube having an inner end extending in surrounding relation to the end of an outlet tube, said inlet and outlet tubes defining an annular passage therebetween which fluidly communicates with and discharges particles into a collection space, a bladed deflector unit mounted in the intake end of said inlet tube and imparting a swirling movement to the incoming fluid so that particles in the moving fluid stream are centrifugally displaced toward the inner surface of the inlet tube and move through said annular passage in the outer annular portion of said stream while the relatively clean gas central portion of the stream discharges through said outlet tube, said deflector unit comprising a shroud on the upstream end of said unit mounted on said inlet tube, a baffle mounted on the downstream end of said unit having its upstream end in longitudinally spaced relation to the downstream end of said shroud and disposed within the inlet tube so as to be substantially centered with both of said tubes and disposed in axially spaced relation to the adjacent end of said outlet tube, a plurality of inclined deflector blades of generally triangular configuration extending from the shroud through said inlet tube rigidly interconnected between said shroud and baffle, said blades each having only its apex secured to the downstream end of said shroud so as to be in substantially non-blocking relation to the intake end of said inlet tube and having its base secured to said baffle, said deflector blades combining with said baffle to block axial flow of gas through said deflector unit except for a plurality of relatively small openings of predetermined finite size spaced around the periphery of said baffle, each opening being defined by the intersection of two adjacent blades and the periphery of said baffle.

2. The device defined in claim 1, wherein the cross-sectional flow area of said outlet tube is in the order of 18% to 42% of the cross-sectional flow area of said shroud and the cross-sectional area of said radial innermost portions of said openings projected upon a plane normal to the axis of said inlet chamber is in the range of a finite amount greater than zero but not more than 2.5% of the flow area of said shroud.

3. The apparatus defined in claim 1, wherein the diameter of said outlet tube is in the order of about 1″ to 1.5″ and wherein the baffle is imperforate and in the order of about ⅞″ in diameter.

4. Apparatus as defined in claim 1, wherein the inlet tube is cylindrical and the radially outer edges of said blades lie substantially in a common cylindrical envelope at said inner surface.

5. Apparatus as defined in claim 4, wherein the radially inner edges of said blades lie substantially in a frusto-conical envelope.

6. Apparatus as defined claim 1, wherein angularly projecting ledges are provided along the radially inner edges of said blades.

7. The device defined in claim 1, wherein each of said blades has a base extending between said inner and outer edges in a plane adjacent said baffle.

8. The device defined in claim 1, wherein said deflector unit consists essentially of said shroud, blades and baffle formed as an integral member and having means for mounting it on said inlet tube.

9. The device defined in claim 1, wherein said blades are generally helically curved between their radial inner and outer edges for imparting a substantially helical path to the incoming gas.

10. A device for separating entrained solids from a gaseous fluid stream comprising:
   (a) a pair of parallel partitions having aligned apertures, the apertures in one of said partitions being larger than the apertures in the other of said partitions, said partitions being interposed in said stream so that the gaseous fluid must pass through the apertures thereof;
   (b) a plurality of relatively larger tubes, one interfitting in interlocking relation with each of the apertures of said one partition and extending toward but terminating in spaced relation from the other partition;
   (c) a like plurality of relatively smaller tubes interfitting in interlocking relation with the apertures of said other partition and extending in radially spaced relation into the adjacent ends of the aligned ones of said relatively larger tubes; and
   (d) means at the inlet end of each of said relatively larger tubes and terminating in spaced relation from the ends of the relatively smaller tubes for imparting a tangential swirl to gaseous fluid and entrained solids passing into said relatively larger tubes through said one partition whereby the entrained solids are primarily discharged from said larger tubes between said partitions in surrounding relation to said smaller tubes and the gaseous fluid is discharged primarily through said smaller tubes to the side of said other partition remote from said one partition;
   (e) said means for imparting a tangential swirl to the gaseous fluid in each of said larger tubes comprising:
      (1) an annular shroud disposed at the inlet end of said relatively larger tube;
      (2) a circular baffle disposed in axial alignment with said relatively larger tube and normal to the stream and having its upstream end in axially spaced relation to the downstream end of said shroud, said baffle also disposed in axially spaced relation upstream of the inlet end of said relatively smaller tube; and
      (3) a plurality of blades of generally triangular configuration extending rigidly between said shroud and baffle and inclined to impart a tangential component to the velocity of the stream as it passes between said shroud and said baffle, each of said blades having only its apex secured to the downstream end of said shroud and having its base secured to said baffle, the radially inner edges of said blades defining a frusto-conical envelope surrounding an unobstructed inlet chamber upstream of the baffle, and said blades combining with said baffle to block axial flow of gas through said swirl imparting means except for a plurality of relatively small openings of predetermined finite size spaced around the periphery of said baffle, each opening being defined by the intersection of two adjacent blades and the periphery of said baffle.

11. The device defined in claim 10 wherein said apertures and tubes are arranged in a plurality of parallel rows and wherein the apertures of adjacent rows are offset by an amount substantially equal to one-half the spacing between adjacent apertures in a given row whereby the spacing between rows is minimized.

References Cited

UNITED STATES PATENTS

| | | | |
|---|---|---|---|
| 1,349,608 | 8/1920 | Donaldson | 55—447 X |
| 1,396,882 | 11/1921 | Rudzinski | 55—456 X |
| 1,525,136 | 2/1925 | Kopke | 55—447 X |
| 2,201,301 | 5/1940 | Richardson | 55—347 X |
| 2,569,909 | 10/1951 | Umney | 55—347 X |
| 2,647,588 | 8/1953 | Miller | 55—347 X |
| 2,806,551 | 9/1957 | Heinrich | 55—347 X |
| 2,936,043 | 5/1960 | Armstrong et al. | 55—449 X |
| 3,030,755 | 4/1962 | Farr et al. | 55—456 |
| 3,169,842 | 2/1965 | Streete et al. | 55—449 |
| 2,509,172 | 5/1950 | Schreier et al. | 261—79 |
| 2,609,062 | 9/1952 | Schreier et al. | 55—257 X |
| 1,790,305 | 1/1931 | Hawley | 55—455 X |
| 1,930,476 | 10/1933 | Hawley | 55—455 X |
| 1,933,588 | 11/1933 | Hawley | 55—455 X |
| 3,086,343 | 4/1963 | Stern | 55—456 |
| 3,348,364 | 10/1967 | Henby | 55—457 X |

FOREIGN PATENTS 520,529  6/1930  Belgium.

OTHER REFERENCES

Hi-eF Purifiers (D), The V. D. Anderson Company, division of IBEC, 1935, W. 96th St., Cleveland 2, Ohio, Form Nos. 307, and 308, copy received July 7, 1966.

Hi-eF Purifiers (C), The V. D. Anderson Company, division of IBEC, 1935 W. 96th St., Cleveland 2, Ohio, Form Nos. 323 and 324, copy received July 7, 1966.

HARRY B. THORNTON, *Primary Examiner.*

DENNIS E. TALBERT, JR., *Assistant Examiner.*

U.S. Cl. X.R.

55—348, 450, 457; 210—512